United States Patent
Hirose et al.

(10) Patent No.: US 10,811,681 B2
(45) Date of Patent: Oct. 20, 2020

(54) NEGATIVE ELECTRODE ACTIVE MATERIAL, NEGATIVE ELECTRODE, LITHIUM ION SECONDARY BATTERY, METHOD FOR PRODUCING NEGATIVE ELECTRODE MATERIAL FOR NON-AQUEOUS ELECTROLYTE SECONDARY BATTERY AND METHOD FOR PRODUCING LITHIUM ION SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/772,693

(22) PCT Filed: Oct. 27, 2016

(86) PCT No.: PCT/JP2016/004730
§ 371 (c)(1),
(2) Date: May 1, 2018

(87) PCT Pub. No.: WO2017/085907
PCT Pub. Date: May 26, 2017

(65) Prior Publication Data
US 2019/0140271 A1 May 9, 2019

(30) Foreign Application Priority Data
Nov. 20, 2015 (JP) .................................. 2015-227293

(51) Int. Cl.
*H01M 4/48* (2010.01)
*H01M 4/36* (2006.01)
(Continued)

(52) U.S. Cl.
CPC ............. *H01M 4/483* (2013.01); *H01M 4/13* (2013.01); *H01M 4/131* (2013.01); *H01M 4/134* (2013.01);
(Continued)

(58) Field of Classification Search
CPC ........ H01M 4/483; H01M 4/366; H01M 4/13; H01M 4/625; H01M 10/0525; H01M 2004/027
See application file for complete search history.

(56) References Cited

U.S. PATENT DOCUMENTS 5,395,711 A 3/1995 Tahara et al.
7,459,236 B2 12/2008 Konishiike et al.
(Continued)

FOREIGN PATENT DOCUMENTS

CN 102110853 A 6/2011
CN 102214824 A 10/2011
(Continued)

OTHER PUBLICATIONS

Sepehri-Amin et al., Evidence for nano-clusters in amorphous SiO anode materials for rechargeable Li-ion batteries, Scripta Materialia, vol. 69, Issue 1, Jul. 2013, pp. 92-95 (Year: 2013).*
(Continued)

*Primary Examiner* — Osei K Amponsah
(74) *Attorney, Agent, or Firm* — Oliff PLC (57) ABSTRACT

A negative electrode active material contains particles of negative electrode active material, wherein the particles of negative electrode active material contain a silicon compound represented by $SiO_x$ ($0.5 \leq x \leq 1.6$), and when the par-
(Continued)

ticles of negative electrode active material are measured by an atom probe method, and an Si 75% equivalent concentration surface obtained by the atom probe method is defined to be a boundary surface of a silicon grain, an average diameter of the silicon grains at a center portion of the particle in the particles of negative electrode active material is in the range of 0.25 nm to 5 nm. According to this constitution, when it is used as the negative electrode active material of a secondary battery, a negative electrode active material is capable of increasing battery capacity and improving cycle characteristics.

15 Claims, 3 Drawing Sheets

(51) Int. Cl.
  *H01M 4/62*       (2006.01)
  *H01M 10/0525*    (2010.01)
  *H01M 4/13*       (2010.01)
  *H01M 4/131*      (2010.01)
  *H01M 4/134*      (2010.01)
  *H01M 4/66*       (2006.01)
  *H01M 4/38*       (2006.01)
  *C22C 9/00*       (2006.01)
  *C22C 19/03*      (2006.01)
  *H01M 4/02*       (2006.01)

(52) U.S. Cl.
  CPC ........... *H01M 4/362* (2013.01); *H01M 4/366* (2013.01); *H01M 4/386* (2013.01); *H01M 4/625* (2013.01); *H01M 4/661* (2013.01); *H01M 10/0525* (2013.01); *C22C 9/00* (2013.01); *C22C 19/03* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2011/0159368 | A1* | 6/2011 | Hirose ............... H01M 4/134 429/219 |
| 2011/0244333 | A1* | 10/2011 | Kawada ............ H01M 4/131 429/231.8 |
| 2013/0196158 | A1* | 8/2013 | Yoshida ............. H01M 4/364 428/402 |
| 2015/0221950 | A1 | 8/2015 | Minami et al. |
| 2015/0303468 | A1 | 10/2015 | Kamo et al. |
| 2015/0325839 | A1 | 11/2015 | Put et al. |
| 2016/0118655 | A1 | 4/2016 | Yoshikawa et al. |
| 2016/0218357 | A1 | 7/2016 | Yoshikawa et al. |

FOREIGN PATENT DOCUMENTS

| | | |
|---|---|---|
| CN | 103118976 A | 5/2013 |
| CN | 104603993 A | 5/2015 |
| CN | 104937751 A | 9/2015 |
| CN | 105024058 A | 11/2015 |
| CN | 105264698 A | 1/2016 |
| CN | 105409040 A | 3/2016 |
| CN | 105612636 A | 5/2016 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2011-222151 A | 11/2011 |
| JP | 2012-033317 A | 2/2012 |
| JP | 2015-072809 A | 4/2015 |
| WO | 2014/095811 A1 | 6/2014 |
| WO | 2014/192225 A1 | 12/2014 |
| WO | 2015/041063 A1 | 3/2015 |

OTHER PUBLICATIONS

Oct. 9, 2018 Office Action issued in Japanese Patent Application No. 2015-227293.
Dec. 22, 2016 International Search Report issued in International Patent Application No. PCT/JP2016/004730.
May 22, 2018 International Preliminary Report on Patentability issued in International Patent Application No. PCT/JP2016/004730.
Jan. 30, 2020 Office Action issued in Taiwanese Patent Application No. 105136358.
Jul. 7, 2020 Office Action and Search Report issued in Chinese Patent Application 201680066961.X.
H. Sepehri-Amin et al., <Scripta Materialia>, "Evidence for nano-Si clusters in amorphous SiO anode materials for rechargeable Li-ion batteries", vol. 69, No. 1, pp. 92 to 95, Feb. 27, 2013.

* cited by examiner

NEGATIVE ELECTRODE ACTIVE MATERIAL, NEGATIVE ELECTRODE, LITHIUM ION SECONDARY BATTERY, METHOD FOR PRODUCING NEGATIVE ELECTRODE MATERIAL FOR NON-AQUEOUS ELECTROLYTE SECONDARY BATTERY AND METHOD FOR PRODUCING LITHIUM ION SECONDARY BATTERY

TECHNICAL FIELD

The present invention relates to a negative electrode active material, a negative electrode, a lithium ion secondary battery, a method for producing a negative electrode material for a non-aqueous electrolyte secondary battery and a method for producing a lithium ion secondary battery.

BACKGROUND ART

In recent years, small electronic devices represented by mobile terminals and the like have been widely spread, and further miniaturization, weight reduction and prolongation of life are strongly required. In response to such market demands, development of secondary batteries that are particularly compact, lightweight and capable of obtaining high energy density has been progressed. This secondary battery has been also investigated to apply, not limited only to small sized electronic devices, to large sized electronic devices represented by an automobile and the like, and power storage system represented by houses and the like.

Among these, a lithium ion secondary battery is markedly expected since it is easy to make compact and high capacity, and can obtain high energy density than those of lead batteries and nickel cadmium batteries.

The lithium ion secondary battery has an electrolytic solution together with a positive electrode, a negative electrode and a separator, and the negative electrode contains a negative electrode active material which participates in a charge and discharge reaction.

As the negative electrode active material, a carbon-based active material has widely been used, and on the other hand, further improvement in battery capacity has been required from recent market demands. In order to improve the battery capacity, it has been investigated to use silicon as a negative electrode active material. This is because theoretical capacity of silicon (4,199 mAh/g) is not less than 10 times larger than the theoretical capacity of graphite (372 mAh/g), so that a significant improvement in battery capacity can be expected. Development of a silicon material as a material of the negative electrode active material has been investigated not only a silicon simple substance but also a compound represented by an alloy or an oxide and the like. Also, the shape of the active material has been widely investigated from a coating type which is a standard in the carbon-based active material to an integrated type which is directly deposited on a current collector.

However, when silicon is used as a main raw material of the negative electrode active material, the negative electrode active material expands and shrinks at the time of charge and discharge, so that it is likely to break mainly in the vicinity of the surface layer of negative electrode active material. In addition, an ionic substance is generated inside the active material, and the negative electrode active material becomes a substance which is easily broken. If the surface layer of negative electrode active material is broken, a new surface is generated thereby, so that the reaction area of the active material increases. At this time, a decomposition reaction of the electrolytic solution occurs on the new surface, and a coating film which is a decomposed product of the electrolytic solution is formed on the new surface, so that the electrolytic solution is consumed. Therefore, the cycle characteristics tend to likely be lowered.

Various investigations have been made until now on negative electrode materials for lithium ion secondary batteries comprising a silicon material as a main component and electrode constitution in order to improve initial battery efficiency and cycle characteristics.

Specifically, for the purpose of obtaining good cycle characteristics and high safety, silicon and amorphous silicon dioxide are simultaneously deposited by a gas phase method (for example, see Patent Document 1). In addition, in order to obtain high battery capacity and safety, a carbon material (electron conductive material) is provided on a surface layer of silicon oxide particles (for example, see Patent Document 2). Further, in order to improve cycle characteristics and to obtain high input-output characteristics, an active material containing silicon and oxygen is prepared and an active material layer having a high oxygen ratio is formed in the vicinity of a current collector (for example, see Patent Document 3). Also, in order to improve cycle characteristics, it is so constituted that oxygen is contained in a silicon active material, an average oxygen content is 40 at % or less, and the oxygen content is increased in a place close to a current collector (for example, see Patent Document 4).

Also, in order to improve initial charge and discharge efficiency, a nanocomposite containing an Si phase, $SiO_2$ and $M_yO$ metal oxide is used (for example, see Patent Document 5). Further, in order to improve cycle characteristics, $SiO_x$ ($0.8 \leq x \leq 1.5$, particle size range=1 μm to 50 μm) and a carbon material are mixed and baked at a high temperature (for example, see Patent Document 6). Moreover, in order to improve cycle characteristics, a molar ratio of oxygen to silicon in a negative electrode active material is set to 0.1 to 1.2, and the active material is controlled in the range that the difference between the maximum value and the minimum value of the molar ratio in the vicinity of the active material and a current collector is 0.4 or less (for example, see Patent Document 7). Furthermore, in order to improve battery load characteristics, a metal oxide containing lithium is used (for example, see Patent Document 8). Also, in order to improve cycle characteristics, a hydrophobic layer such as a silane compound is formed on a surface layer of a silicon material (for example, see Patent Document 9). Further, in order to improve cycle characteristics, silicon oxide is used and a graphite coating is formed on the surface layer thereof to impart conductivity (for example, see Patent Document 10). In Patent Document 10, with regard to a shift value obtained from the RAMAN spectrum relating to a graphite coating, broad peaks appear at 1330 $cm^{-1}$ and 1580 $cm^{-1}$, and their intensity ratio $I_{1330}/I_{1580}$ is $1.5 < I_{1330}/I_{1580} < 3$. Moreover, in order to improve high battery capacity and cycle characteristics, particles having a silicon microcrystalline phase dispersed in silicon dioxide are used (for example, see Patent Document 11). Furthermore, in order to improve overcharge and overdischarge characteristics, silicon oxide whose ratio of atomic number of silicon and oxygen is controlled to 1:y ($0 < y < 2$) is used (for example, see Patent Document 12).

CITATION LIST

Patent Literature

Patent Document 1: Japanese Patent Laid-Open Publication No. 2001-185127
Patent Document 2: Japanese Patent Laid-Open Publication No. 2002-042806

Patent Document 3: Japanese Patent Laid-Open Publication No. 2006-164954
Patent Document 4: Japanese Patent Laid-Open Publication No. 2006-114454
Patent Document 5: Japanese Patent Laid-Open Publication No. 2009-070825
Patent Document 6: Japanese Patent Laid-Open Publication No. 2008-282819
Patent Document 7: Japanese Patent Laid-Open Publication No. 2008-251369
Patent Document 8: Japanese Patent Laid-Open Publication No. 2008-177346
Patent Document 9: Japanese Patent Laid-Open Publication No. 2007-234255
Patent Document 10: Japanese Patent Laid-Open Publication No. 2009-212074
Patent Document 11: Japanese Patent Laid-Open Publication No. 2009-205950
Patent Document 12: Japanese Patent No. 2,997,741

SUMMARY OF INVENTION

Technical Problem

In recent years, miniaturized mobile devices represented by electronic devices have been improved in high performance and multifunctionalization, and an increase in battery capacity is required for lithium ion secondary batteries, which is the main power source thereof. As one means to solve the problem, development of a lithium ion secondary battery comprising a negative electrode using a silicon material as a main material has been desired. In addition, the lithium ion secondary battery using the silicon material has been desired to have the cycle characteristics similar to those of a lithium ion secondary battery using a carbon-based active material. However, it has not yet been reached to propose a negative electrode active material having cycle stability equivalent to that of a lithium ion secondary battery using a carbon-based active material.

The present invention was made in view of the above situation, and has an object to provide a negative electrode active material which is capable of increasing battery capacity and improving cycle characteristics when it is used as a negative electrode active material of a secondary battery, a negative electrode having a negative electrode active material layer containing the negative electrode active material, and a lithium ion secondary battery using the negative electrode. In addition, another object is to provide a method for producing a negative electrode material for a non-aqueous electrolyte secondary battery which is capable of increasing battery capacity and improving cycle characteristics. It is further an object to provide a method for producing a lithium ion secondary battery using such a negative electrode material for a non-aqueous electrolyte secondary battery.

Solution to Problem

To accomplish the objects, the present invention is to provide a negative electrode active material containing particles of negative electrode active material, wherein the particles of negative electrode active material contain a silicon compound represented by $SiO_x$ ($0.5 \leq x \leq 1.6$), and when the particles of negative electrode active material are measured by an atom probe method and an Si 75% equivalent concentration surface obtained by the atom probe method is defined to be a boundary surface of a silicon grain, an average diameter of the silicon grains at a center portion of the particle in the particles of negative electrode active material is in the range of 0.25 nm to 5 nm.

Thus, if the average diameter of the silicon grains at a center portion of the particle in the particles of negative electrode active material is within the defined range, degradation of a silicon compound ($SiO_x$: $0.5 \leq x \leq 1.6$, hereinafter also referred to as silicon oxide) accompanied by the charge and discharge cycles can be reduced, and also the load resistance portion caused by the silicon dioxide component in the silicon oxide can be reduced. Accordingly, when the negative electrode active material containing the particles of negative electrode active material is used as the negative electrode active material of a lithium ion secondary battery, a battery having high battery capacity and good cycle characteristics can be obtained.

When a ratio A/B of a maximum length A and a minimum length B of the silicon grain is calculated, an average value of the ratio A/B of the silicon grains contained at a surface layer portion of the particle in the particles of negative electrode active material is preferably larger than an average value of the ratio A/B of the silicon grains contained at the center portion of the particle in the particles of negative electrode active material.

In particular, Li ions are required to be diffused in the surface layer portion of the particle smoothly, so that the silicon grain is preferably long. That is, the ratio A/B is preferably large. However, when the silicon grains having a large ratio A/B exist to a center portion of the bulk, it tends to lead to degradation peculiar to silicon, so that it is desirable to exist the silicon grains having a large ratio A/B only at the portion of the surface layer portion of the particle at which the Li is accepted. In other words, it is desirable that the silicon grains having a small ratio A/B exist at the center portion of the particle.

When the particles of negative electrode active material are measured by the atom probe method, it is preferable that silicon and oxygen each have a concentration distribution of 1 at % or more and 10 at % or less at the center portion of the particle in the particles of negative electrode active material.

If the concentration distribution at the center portion of the particle in the particles of negative electrode active material is within the range, silicon oxide can be suitably disproportionated. Accordingly, it is possible to prevent the silicon in the silicon oxide from degrading and the load of the silicon dioxide component from increasing.

It is also preferable that the particles of negative electrode active material have a carbon material on a surface thereof.

Thus, by having the carbon material on the surface of the particles of negative electrode active material, improvement in conductivity can be obtained so that when the negative electrode active material containing such particles of negative electrode active material is used as a negative electrode active material of a lithium ion secondary battery, battery characteristics can be improved.

An average thickness of the carbon material is preferably 5 nm or more and 5,000 nm or less.

If the average thickness of the carbon material to be coated is 5 nm or more, improvement in conductivity can be realized, while if the average thickness of the carbon material to be coated is 5,000 nm or less, when the negative electrode active material containing such particles of negative electrode active material is used as a negative electrode active material of a lithium ion secondary battery, lowering in battery capacity can be suppressed.

When the particles of negative electrode active material are measured by the atom probe method, it is preferable that silicon and oxygen each have a concentration distribution of 10 at % or more in the depth direction at the surface layer portion of the particle in the particles of negative electrode active material.

When the silicon grains are arranged microscopically within the particles of negative electrode active material, although cycle characteristics are improved, Li acceptability becomes worse. That is, Li is difficultly inserted. Accordingly, in order to further improve the Li acceptability while maintaining the cycle characteristics, it is preferable that the disposition of the silicon grains is deviated at the surface layer portion of the particle in the particles of negative electrode active material, specifically the concentration distributions in the depth direction of silicon and oxygen are each made 10 at % or more.

When the particles of negative electrode active material are measured by the atom probe method, it is preferable that a silicon concentration at the surface layer portion of the particle in the particles of negative electrode active material is higher than a silicon concentration at the center portion of the particle in the particles of negative electrode active material.

When such a negative electrode active material is employed, it is possible to further heighten the Li acceptability while preventing degradation of the cycle characteristics.

When an aspect ratio of the silicon grain is calculated, it is preferable that an average value of the aspect ratio of the silicon grains contained at the surface layer portion of the particle in the particles of negative electrode active material is larger than an average value of the aspect ratio of the silicon grains contained at the center portion of the particle in the particles of negative electrode active material.

When such a negative electrode active material is employed, it is possible to diffuse Li ions more smoothly at the surface layer portion of the particle while preventing degradation of the cycle characteristics.

It is preferable that the negative electrode active material has a half value width (2θ) of a diffraction peak attributable to a Si (111) crystal plane obtained by X-ray diffraction of 1.2° or more and has a crystallite size corresponding to the crystal face is 7.5 nm or less.

Since the negative electrode active material contains the silicon oxide having crystallinity of the Si crystallite, when such a negative electrode active material is used as a negative electrode active material of a lithium ion secondary battery, better cycle characteristics and initial charge and discharge characteristics can be obtained.

A median diameter of the particles of negative electrode active material is preferably 1 μm or more and 15 μm or less.

Since the median diameter of the particles of negative electrode active material is within the defined range, when the negative electrode active material containing such particles of negative electrode active material is used as a negative electrode active material of a lithium ion secondary battery, better cycle characteristics and initial charge and discharge characteristics can be obtained.

In the present invention, it is further provided a negative electrode which comprises a negative electrode active material layer containing the negative electrode active material of the present invention, and
a negative electrode current collector,
wherein, the negative electrode active material layer is formed on the negative electrode current collector, and the negative electrode current collector contains carbon and sulfur, and contents thereof are each 100 ppm by mass or less.

Thus, the negative electrode current collector constituting the negative electrode contains carbon and sulfur with the defined contents, so that deformation of the negative electrode at the time of charging can be suppressed.

The negative electrode is preferably a material in which a length of the silicon grains in the negative electrode active material is increased by repeating charge and discharge.

When such a negative electrode is employed, it can be easily carried out to insert and remove the Li by repeating charge and discharge.

In the present invention, it is further provided a lithium ion secondary battery which comprises using the negative electrode of the present invention as a negative electrode.

When the lithium ion secondary battery using such a negative electrode is employed, high capacity as well as good cycle characteristics can be obtained.

In the present invention, it is provided a method for producing a negative electrode material for a non-aqueous electrolyte secondary battery containing particles of negative electrode active material, which comprises:
preparing particles of negative electrode active material containing a silicon compound represented by the general formula: $SiO_x$ (0.5≤x≤1.6),
measuring the particles of negative electrode active material by an atom probe method,
when an Si 75% equivalent concentration surface obtained by the atom probe method is defined to be a boundary surface of a silicon grain, selecting particles of negative electrode active material having an average diameter of the silicon grains at a center portion of the particle in the particles of negative electrode active material of in the range of 0.25 nm to 5 nm, and
producing a negative electrode material for a non-aqueous electrolyte secondary battery using the selected particles of negative electrode active material.

The particles of negative electrode active material are thus selected to produce a negative electrode material, whereby a negative electrode material which has high capacity and good cycle characteristics can be produced when it is used as a negative electrode material of a lithium ion secondary battery.

Before the step of measuring, it is preferable to have a step of forming a carbon material on a surface of the particles of negative electrode active material.

When such a producing process is employed, a negative electrode material containing the particles of negative electrode active material more excellent in conductivity can be produced.

In the present invention, it is further provided a method for producing a lithium ion secondary battery which comprises producing a negative electrode using the negative electrode material for a non-aqueous electrolyte secondary battery produced by the method for producing a negative electrode material for a non-aqueous electrolyte secondary battery of the present invention, and producing a lithium ion secondary battery using the produced negative electrode.

This producing method can produce a lithium ion secondary battery having high capacity and good cycle characteristics by using the negative electrode material containing the thus selected particles of negative electrode active material.

Advantageous Effects of Invention

When the negative electrode active material of the present invention is used as a negative electrode active material of a lithium ion secondary battery, high capacity and good cycle characteristics can be obtained. In addition, when a method for producing the negative electrode material of the present invention is employed, a negative electrode material for a lithium ion secondary battery having good cycle characteristics can be produced.

DESCRIPTION OF EMBODIMENTS

In the following, embodiments of the present invention are explained, but the present invention is not limited by these.

As one of the means to increase the battery capacity of the lithium ion secondary battery, it has been investigated to use a negative electrode using a silicon material as a main material, as a negative electrode of a lithium ion secondary battery. The lithium ion secondary battery using the silicon material has been desired to have cycle characteristics substantially equivalent to those of the lithium ion secondary battery using a carbon-based active material, but it has not yet been proposed a negative electrode active material showing the equivalent cycle characteristics to those of the lithium ion secondary battery using the carbon-based active material.

Thus, the present inventors have intensively studied on a negative electrode active material that can provide good cycle characteristics when it is used as a negative electrode of a lithium ion secondary battery. As a result, when a negative electrode active material which is a negative electrode active material containing particles of negative electrode active material, wherein the particles of negative electrode active material contain a silicon compound represented by $SiO_x$ ($0.5 \leq x \leq 1.6$), and when the particles of negative electrode active material are measured by the atom probe method and an Si 75% equivalent concentration surface obtained by the atom probe method is defined to be a boundary surface of the silicon grain, an average diameter of the silicon grains at the center portion of the particle in the particles of negative electrode active material is in the range of 0.25 nm to 5 nm, is used, high battery capacity and good cyclic can be obtained whereby they have accomplished the present invention.

<Negative Electrode>

Figure 1:
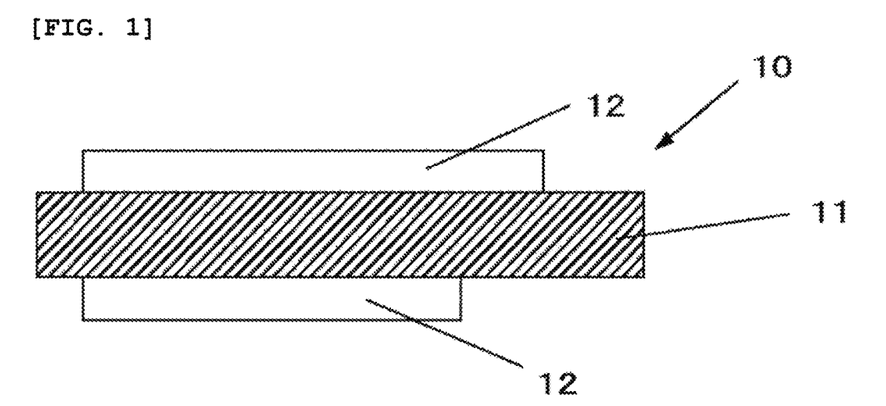
FIG. 1 is a cross-sectional view showing one example of the constitution of the negative electrode according to the present invention.

First, the negative electrode (negative electrode for non-aqueous electrolyte secondary battery) is explained. FIG. 1 is a cross-sectional view showing one example of the constitution of the negative electrode (hereinafter also referred to as a negative electrode) according to the present invention.

[Constitution of Negative Electrode]

As shown in FIG. 1, a negative electrode 10 is configured to have a negative electrode active material layer 12 on a negative electrode current collector 11. In addition, the negative electrode active material layer 12 may be provided on both sides, or, only on one side of the negative electrode current collector 11. Further, as long as the negative electrode active material of the present invention is used, the negative electrode current collector 11 may be omitted.

[Negative Electrode Current Collector]

The negative electrode current collector 11 is constituted by an excellent conductive material, and a material excellent in mechanical strength. Examples of the conductive material that can be used for the negative electrode current collector 11 may be mentioned, for example, copper (Cu) and nickel (Ni). The conductive material is preferably a material which does not form an intermetallic compound with lithium (Li).

The negative electrode current collector 11 preferably contains carbon (C) or sulfur (S) in addition to the main element. This is because the physical strength of the negative electrode current collector 11 is improved. In particular, when the negative electrode has an active material layer that expands during charging, if the current collector contains the elements, there is an effect of suppressing deformation of the electrode including the current collector. The content of each of the contained elements is not particularly limited, and it is preferable to be above all 100 ppm by mass or less. This is because a higher suppressing effect against the deformation can be obtained. By such a deformation suppressing effect, the cycle characteristics can be further improved.

The surface of the negative electrode current collector 11 may be roughened or may not be roughened. The roughened negative electrode current collector is, for example, a metal foil subjected to electrolytic treatment, embossing treatment, chemical etching treatment or the like. The unroughened negative electrode current collector is, for example, a rolled metal foil or the like.

[Negative Electrode Active Material Layer]

The negative electrode active material layer 12 contains the negative electrode active material of the present invention capable of storing and releasing lithium ions, and from the viewpoint of battery design, it may further contain other materials such as a negative electrode binding agent (binder), a conductive assistant and the like.

The negative electrode active material of the present invention contains particles of negative electrode active material. The particles of negative electrode active material have a core portion capable of storing and releasing lithium ions. In the case where the particles of negative electrode active material have a carbon material on the surface thereof, these further have a carbon coating portion that provides conductivity.

The particles of negative electrode active material contain a silicon compound ($SiO_x$: $0.5 \leq x \leq 1.6$), and the composition of the silicon compound is preferably that where "x" is close to 1. This is because stable battery characteristics can be obtained. The composition of the silicon compound in the present invention does not necessarily mean purity of 100%, and a minute amount of impurity element(s) may be contained.

The negative electrode active material of the present invention has the characteristics that the particles of negative electrode active material are measured by an atom probe method and an Si 75% equivalent surface concentration obtained by the atom probe method is defined to be a boundary surface of the silicon grain, an average diameter of the silicon grains at the center portion of the particle in the particles of negative electrode active material is in the range of 0.25 nm to 5 nm.

Thus, if the average diameter of the silicon grains contained in the center portion of the particle in the particles of negative electrode active material is in the defined range, it is possible to reduce the degradation of the silicon oxide accompanied by the charge and discharge cycles, and also to reduce the load resistance portion caused by the silicon dioxide component in the silicon oxide. Accordingly, when the negative electrode active material containing the particles of negative electrode active material is used as a negative electrode active material of a lithium ion secondary battery, the resulting battery has a high battery capacity, and good cycle characteristics and stable battery characteristics can be obtained. On the other hand, if the average diameter exceeds 5 nm, cycle characteristics are lowered. Incidentally, 0.25 nm is a detection limit of the particle size in the atom probe method. If the average diameter is smaller than 0.25 nm, the battery cycle characteristics is presumed to be favorably shifted, but it is also presumed that the initial efficiency is lowered.

In the present invention, the center portion of the particle is defined to be an inside of a cube with one side of 40 nm having a midpoint (center point) of the line segment where the length of the line is the longest as a center when a line is drawn from the outermost surface of the particle of the negative electrode active material through the interior of the particle to the opposite side.

The Si 75% equivalent concentration surface is a curved surface obtained by connecting portions containing 75 at % (atomic %) of Si in a three-dimensional space. Specifically, it connects portions where Si is detected at 75 at % in Voxel Size (nm) [0.5, 0.5, 0.5].

The average diameter of the silicon grains can be calculated using the maximum length A and the minimum length B of the silicon grains as shown in the following formula.

Average diameter=(Average value of maximum length $A$+Average value of minimum length $B$)/2

The maximum length A of the silicon grain is the length of silicon grain where the length of a line is the longest when a line is drawn from the outermost surface of the silicon grain through the inside of the silicon grain to the opposite side. The minimum length B of the silicon grain is the length of silicon grain where the length of the line is the shortest. Incidentally, the line representing the maximum length A and the line representing the minimum length B do not necessarily cross at right angles.

When the ratio A/B of the maximum length A and the minimum length B of the silicon grain is calculated, the average value of the ratio A/B of the silicon grains contained at the surface layer portion of the particle in the particles of negative electrode active material is preferably larger than the average value of the ratio A/B of the silicon grains contained at the center portion of the particle in the particles of negative electrode active material.

In particular, the surface layer portion of the particle is required to smoothly diffuse Li ions, so it is preferable that the silicon grain be long. That is, it is preferable that the ratio A/B is large. However, if the silicon grains having a large ratio A/B exist to the center portion of the bulk, it tends to lead to degradation peculiar to silicon, so that it is desirable to exist the silicon grains having a large ratio A/B only at the portion at which the Li is accepted of the surface layer portion of the particle. In other words, it is desirable that the silicon grains having a small ratio A/B exist at the center portion of the particle.

In the present invention, the surface layer portion of the particle is defined to be a depth range extending from the outermost surface of the silicon oxide to the center point by 100 nm.

When the aspect ratio of the silicon grain is calculated, it is preferable that an average value of the aspect ratio of the silicon grains contained at the surface layer portion of the particle in the particles of negative electrode active material is larger than an average value of the aspect ratio of the silicon grains contained at the center portion of the particle in the particles of negative electrode active material.

When such a negative electrode active material is employed, it is possible to diffuse Li ions more smoothly in the surface layer portion of the particle while preventing degradation of cycle characteristics.

The aspect ratio is a ratio of the longitudinal direction of the particle to the length in the short direction perpendicular to the longitudinal direction. Specifically, as the aspect ratio, a value obtained by dividing the maximum length A by the longest length among the lengths in the short side direction can be used.

The shape of the silicon grain is not particularly limited, and may be mentioned a spherical shape, a rod shape such as a cylindrical shape, or the like. The shape of the silicon grain at the center portion of the particle is preferably spherical. This is because the ratio A/B and the aspect ratio become small. On the other hand, the shape of the silicon grain at the surface layer portion of the particle is preferably rod-like. This is because the ratio A/B and the aspect ratio becomes large.

When the particles of negative electrode active material are measured by the atom probe method, at the center portion of the particle in the particles of negative electrode active material, it is preferable that the concentration distributions of silicon and oxygen are each 1 at % or more and 10 at % or less.

If the concentration distribution at the center portion of the particle in the particles of negative electrode active material is within the defined range, the silicon oxide can be appropriately disproportionated. That is, it is possible to suppress excessive progress of the disproportionation. Accordingly, it is possible to prevent the silicon in the silicon oxide from degrading and the load of the silicon dioxide component from increasing.

It is preferable that the particles of negative electrode active material have a carbon material on the surfaces thereof.

Thus, since the particles of negative electrode active material have a carbon material on the surfaces thereof, improvement in conductivity can be obtained, so that in the case where the negative electrode active material containing such particles of negative electrode active material is used as the negative electrode active material of the lithium ion secondary battery, the battery characteristics can be improved.

The average thickness of the carbon material is preferably 5 nm or more and 5,000 nm or less.

If the average thickness of the carbon material to be coated is 5 nm or more, improvement in conductivity can be obtained, and if the carbon material to be coated is 5,000 nm or less, in the case where the negative electrode active material containing such particles of negative electrode active material is used as the negative electrode active material of the lithium ion secondary battery, it is possible to suppress lowering in battery capacity.

The average thickness of the carbon material can be calculated, for example, by the following procedure. First, the negative electrode active material is observed at an arbitrary magnification by TEM (transmission electron microscope). The magnification is preferably such that the thickness of the carbon material can be visually confirmed so that the thickness can be measured. Subsequently, the thickness of the carbon material is measured at arbitrary 15 points. In this case, it is preferable to set the measurement position widely and randomly without concentrating on a specific place as much as possible. Finally, the average value of the thicknesses at the 15 points of the carbon material is calculated.

Although the covering ratio of the carbon material is not particularly limited, it is desirable that the covering ratio is as high as possible. If the covering ratio is 30% or more, it is preferable since electrical conductivity is further improved. The covering method of the carbon material is not particularly limited, and sugar carbonization method and thermal decomposition method of a hydrocarbon gas are preferable. This is because the covering ratio can be improved.

When the particles of negative electrode active material are measured by the atom probe method, it is preferable that silicon and oxygen each have a concentration distribution of 10 at % or more in the depth direction at the surface layer portion of the particle in the particles of negative electrode active material.

When the silicon grains are arranged microscopically within the particles of negative electrode active material, although cycle characteristics are improved, Li acceptability becomes worse. That is, Li is difficultly inserted. Accordingly, in order to further improve the Li acceptability while maintaining the cycle characteristics, it is preferable that the disposition of the silicon grains is deviated at the surface layer portion of the particle in the particles of negative electrode active material, specifically the concentration distributions in the depth direction of silicon and oxygen are each made 10 at % or more. In this case, in addition to this, by providing a periodic concentration distribution, and by changing the composition ratio of silicon and oxygen at the time of providing the periodic concentration distribution, it is also possible that Li is to be easily accepted, and an amount of SEI (Solid Electrolyte Interface) generated by decomposition at the battery surface is slightly reduced, whereby initial efficiency can be improved.

When the particles of negative electrode active material are measured by the atom probe method, it is preferable that the silicon concentration at the surface layer portion of the particle in the particles of negative electrode active material is higher than the silicon concentration at the center portion of the particle in the particles of negative electrode active material.

When such a negative electrode active material is employed, it is possible to further enhance Li acceptability while preventing degradation of cycle characteristics.

The negative electrode active material preferably has a half value width (2θ) of a diffraction peak attributable to a Si (111) crystal plane obtained by X-ray diffraction of 1.2° or more, and a crystallite size corresponding to the crystal face of 7.5 nm or less.

It is better that the silicon crystallinity of the silicon oxide as low as possible, and when the Si crystallite in the silicon oxide has the crystallinity, in the case where the negative electrode active material containing such a silicon oxide is used as the negative electrode active material of the lithium ion secondary battery, better cycle characteristics and initial charge and discharge characteristics can be obtained.

The median diameter ($D_{50}$: particle diameter when the cumulative volume is 50%) of the particles of negative electrode active material is not particularly limited, and it is preferably 1 μm or more and 15 μm or less. If the median diameter is within the defined range, lithium ions are more likely to be stored and released at the time of charge and discharge, and the particles are less likely to break. If the median diameter is 1 μm or more, the surface area per mass can be made small, and an increase in battery irreversible capacity can be suppressed. On the other hand, by making the median diameter 15 μm or less, the particles become difficultly crack whereby new surface hardly comes out.

The shape of the particles of negative electrode active material is not particularly limited, and a crushed shape may be mentioned.

The negative electrode is preferably a material in which the length of the silicon grains in the negative electrode active material is increased by repeating charge and discharge thereof.

When such a negative electrode is employed, it becomes easier to insert and remove Li by repeating charge and discharge. By repeating charge and discharge, the Si—Si bond increases. On the other hand, Li silicate also increases. The reason why the Si—Si bond increase is as follows. When the Si—O bond is broken due to charge and discharge, at the initial stage of charge and discharge, it returns to the Si—O bond after forming the Si—Li bond or the O—Li bond. However, there are some cases where the Si—Si bonds are formed without returning to the Si—O bond. According to this phenomenon, the Si grain is enlarged. If the amount of existing Si is large, the possibility of forming the Si—Si bonds also increases. Accordingly, for example, by adjusting the ratio of Si:O so that the Si is in a slightly rich state at the surface layer portion of the particle, only the silicon grains at the surface layer portion of the particle can be grown by charge and discharge.

As the binder of the negative electrode contained in the negative electrode active material layer 12, for example, any one or more kinds of polymer materials, synthetic rubbers and the like can be used. Examples of the polymer material may include, for example, polyvinylidene fluoride, polyimide, polyamideimide, aramid, polyacrylic acid, lithium polyacrylate, carboxymethyl cellulose and the like. Examples of the synthetic rubber may include, for example, styrene butadiene-based rubber, fluorine-based rubber, ethylene propylene diene and the like.

As the negative electrode conductive assistant, for example, any one or more kinds of carbon materials such as carbon black, acetylene black, graphite, ketjen black, carbon nanotube, carbon nanofiber and the like may be used.

The negative electrode active material layer 12 may contain a carbon-based active material in addition to the negative electrode active material (silicon-based active material) of the present invention. According to this constitution, electric resistance of the negative electrode active material layer 12 is lowered and expansion stress accompanying charging can be alleviated. As the carbon-based active material, for example, thermally decomposed carbons, cokes, glassy carbon fibers, fired bodies of organic polymer compounds, carbon blacks and the like may be used.

The negative electrode active material layer 12 can be formed, for example, by a coating method. The coating method is a method in which a silicon-based active material, the binder and the like, and, if necessary, a conductive assistant, and a carbon-based active material are mixed and then dispersed in an organic solvent, water or the like and coated.

[Method for Producing Negative Electrode]

The negative electrode 10 can be produced, for example, by the following procedure. First, a method for producing the negative electrode material to be used for a negative electrode is explained. Particles of negative electrode active material containing a silicon compound represented by the general formula $SiO_x$ ($0.5 \leq x \leq 1.6$) are firstly prepared. Next, the particles of negative electrode active material are measured by the atom probe method. Then, when an Si 75% equivalent concentration surface obtained by the atom probe method is defined to be a boundary surface of the silicon grain, the particles of negative electrode active material having an average diameter of the silicon grains in the range of 0.25 nm to 5 nm at the center portion of the particle in the particles of negative electrode active material are selected. Next, by using the selected particles of negative electrode active material, a negative electrode material for a non-aqueous electrolyte secondary battery is produced.

The particles of negative electrode active material containing the silicon oxide ($SiO_x$: $0.5 \leq x \leq 1.6$) can be produced, for example, by the following method. First, starting materials that generate a silicon oxide gas are heated at a temperature range of 900° C. to 1,600° C. under reduced pressure in the presence of an inert gas, to generate a silicon oxide gas. At this time, as the starting materials, a mixture of metallic silicon powder and silicon dioxide powder may be used. When the presence of surface oxygen on the metallic silicon powder and a minute amount of oxygen in a reaction furnace are considered, the mixing ratio is desirably in the range of 0.8<metallic silicon powder/silicon dioxide powder<1.3.

Next, the generated silicon oxide gas is solidified and deposited on an adsorption plate (deposition plate). Next, at the state where the temperature in the reaction furnace is lowered at 100° C. or less, the deposit of silicon oxide is taken out and pulverized and powdered using a ball mill, a jet mill or the like. The particles of negative electrode active material can be produced as mentioned above.

A size of the Si grain (grain size) in the particles of negative electrode active material can be controlled by changing the vaporization temperature of the starting materials which generate the silicon oxide gas, the temperature of the deposition plate, the injection amount or kind of the gas (an inert gas, a reducing gas) to the deposition flow of the silicon oxide gas, the temperature, time or kind of the carbon source at the heat treatment after formation of the particles of negative electrode active material or at the time of depositing the carbon material mentioned later. The concentration distribution of silicon and oxygen at the center portion of the particle and the periodic concentration distribution in the depth direction of these particle surface layer portions can also be controlled by these parameters.

Next, a carbon material is formed on the surface of the prepared particles of negative electrode active material. However, this step is not indispensable. As a method of forming a layer of the carbon material, a thermal decomposition CVD method is desirable. An example of a method for forming a layer of the carbon material by the thermal decomposition CVD is explained below.

First, the particles of negative electrode active material are set in a furnace. Next, a hydrocarbon gas is introduced into the furnace, and the temperature in the furnace is raised. The decomposition temperature is not particularly limited, and is desirably 1,200° C. or less, more desirably 950° C. or less. By setting the decomposition temperature to 1,200° C. or less, unintended disproportionation of the particles of negative electrode active material can be suppressed. After raising the temperature in the furnace to a predetermined temperature, a carbon material is formed on the surface of the particles of negative electrode active material. The hydrocarbon gas used as the starting material of the carbon material is not particularly limited, and it is desirable that $n \leq 3$ in the composition of $C_nH_m$. If $n \leq 3$, the production cost can be lowered, and the physical properties of the decomposed product can be improved.

When carrying out the CVD, the silicon concentration at the surface layer portion of the particle can be controlled by changing the treatment time and the hydrogen concentration in the atmosphere. In particular, by increasing the hydrogen concentration, the silicon concentration at the surface layer portion of the particle can be increased. A hydrocarbon gas such as methane and the like to be used for the thermal decomposition CVD is decomposed into carbon and hydrogen by heat. This hydrogen reacts with the particles of negative electrode active material under high temperature to reduce the surface layer of the particle. By this reduction with the hydrogen, the oxygen concentration at the surface layer portion of the particle is lowered, and the silicon concentration can be relatively increased. When the CVD is carried out, the hydrogen concentration in the atmosphere may be increased by using a mixed gas of a hydrocarbon gas and a hydrogen gas.

Next, the particles of negative electrode active material are measured by the atom probe method. The particles of negative electrode active material can be measured by the three-dimensional atom probe analyzing method. At this time, the apparatus to be used is not particularly limited, and LEAP 4000XSi (manufactured by AMETEC, Inc.) may be mentioned. The measurement conditions can be made a laser wavelength ($\lambda$) of 355 nm, a laser power of 30 pJ/Pulse, and a sample temperature of 30K. The method for preparing the acicular sample used for the atom probe method is not particularly limited, and an ordinary method can be used. With regard to the particles of negative electrode active material which make it difficult to define the center portion of the particle (for example, a U-letter shape), these may be excluded from the objects of the measurement.

Next, when an Si 75% equivalent concentration surface obtained by the atom probe method is defined to be a boundary surface of the silicon grain, the particles of negative electrode active material having an average diameter of the silicon grains in the range of 0.25 nm to 5 nm at the center portion of the particle in the particles of negative electrode active material are selected. At this time, further selection may be carried out based on the average value of the aspect ratio, the average value of the ratio A/B, the concentration distribution of silicon and oxygen and the like. When 10 to 100 or so of the particles of negative electrode active material are measured, and all of these particles satisfy the definition of the average diameter of the silicon grains and the like, all the particles of negative electrode active material produced under the same conditions may be deemed to satisfy the provisions of the average diameter and the like.

The number of the silicon grains to be measured when calculating the average diameter, the average value of the ratio A/B or the average value of the aspect ratio of the silicon grains is not particularly limited. For example, when calculating the average diameter of the silicon grains at the center portion of the particle, the grain size of the silicon grains may be calculated for all the silicon grains at the center portion of the particle, or the grain size of randomly selected 100 or more and 1,000 or less of the silicon grains alone may be calculated. With regard to the silicon grains having shapes which make it difficult to calculate the grain size, the ratio A/B or the aspect ratio of the silicon grains, these may be excluded from the object of the calculations when calculating these average values.

By changing the conditions for forming the particles of negative electrode active material or the conditions for the carbon coating, and carrying out the measurement by the atom probe method each time, it is also possible to determine the producing conditions that easily satisfy the provision of the average diameter and the like.

Subsequently, using the selected particles of negative electrode active material, a negative electrode material for a non-aqueous electrolyte secondary battery is produced.

When the method for producing the negative electrode material is employed, by measuring the particles of negative electrode active material by the atom probe method, the particles of negative electrode active material having the surface of which Li easily enters into the bulk during reaction with Li and a bulk center portion which maintains cycle characteristics can be certainly selected. Accordingly, when such a negative electrode material is used, a secondary battery having stable battery characteristics can be produced.

The negative electrode material comprising the particles of negative electrode active material thus produced, and other materials such as the negative electrode binder, the conductive assistant and the like are mixed to form a negative electrode mixture, and then, an organic solvent, water, or the like is added thereto to prepare a slurry. Next, the slurry of the negative electrode is coated onto the surface of the negative electrode current collector 11, and dried to form the negative electrode active material layer 12. At this time, hot press or the like may be carried out as necessary. The negative electrode can be produced in this manner.

<Lithium Ion Secondary Battery>

Next, the lithium ion secondary battery of the present invention is explained. The lithium ion secondary battery of the present invention is a material using the negative electrode of the present invention as a negative electrode. Here, as specific examples, a laminate film type lithium ion secondary battery is mentioned as an example.

[Constitution of Laminate Film Type Secondary Battery]

Figure 2:
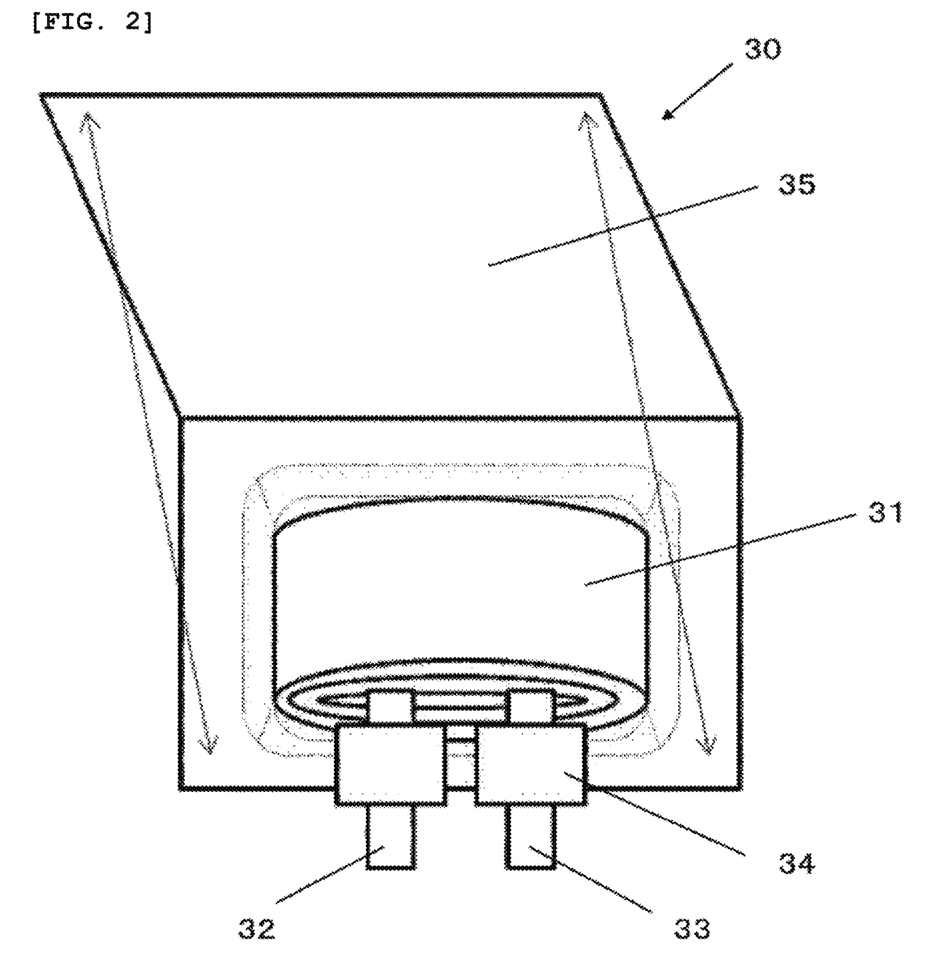
FIG. 2 is an exploded view showing one example of the constitution of a lithium ion secondary battery (a laminate film type) according to the present invention.

The laminate film type lithium ion secondary battery 30 shown in FIG. 2 is a material in which a spirally wound electrode body 31 is housed mainly inside of a sheet-like exterior member 35. This spirally wound body has a separator between a positive electrode and a negative electrode, and is wound. In addition, there is a case where it has a separator between a positive electrode and a negative electrode, and a laminate is housed. In either of the electrode bodies, a positive electrode lead 32 is attached to the positive electrode, and a negative electrode lead 33 is attached to the negative electrode. The outermost peripheral portion of the electrode body is protected by a protective tape.

The positive and negative electrode leads are, for example, led out from the inside to the outside of an exterior member 35 in one direction. The positive electrode lead 32 is formed, for example, by a conductive material such as aluminum and the like, and the negative electrode lead 33 is formed, for example, by a conductive material such as nickel, copper and the like.

The exterior member 35 is, for example, a laminate film in which a fusion layer, a metallic layer and a surface protective layer in this order, and the laminate film is so formed that the outer peripheral edge portions of the fusion layers of the two laminated films are fused to each other or bonded with an adhesive or the like so as to face the fusion layer to the spirally wound electrode body 31. The fused portion is, for example, a film such as polyethylene, polypropylene and the like, and the metal portion is an aluminum foil and the like. The protective layer is, for example, nylon and the like.

An adhesive film 34 is inserted between the exterior member 35 and the positive and negative electrode leads for the prevention of outside air intrusion. This material is, for example, polyethylene, polypropylene, or polyolefin resin.

[Positive Electrode]

The positive electrode has, for example, a positive electrode active material layer(s) on both sides or one side of a positive electrode current collector similar to the negative electrode 10 of FIG. 1.

The positive electrode current collector is formed, for example, by a conductivity material such as aluminum and the like.

The positive electrode active material layer contains any one or two or more kinds of positive electrode materials capable of storing and releasing lithium ions, and may contain other materials such as a binder, a conductive assistant, a dispersant and the like depending on the design. In this case, details regarding the binder and the conductive assistant can be, for example, the same as those of the negative electrode binder and the negative electrode conductive assistant as already mentioned above.

As the positive electrode material, a lithium-containing compound is desirable. The lithium-containing compound may be mentioned, for example, a composite oxide comprising lithium and a transition metal element, a phosphate compound having lithium and a transition metal element. Among these positive electrode materials, a compound having at least one kind of nickel, iron, manganese, cobalt is preferable. The chemical formulae of these positive electrode materials are represented by, for example, $Li_xM1O_2$, or $Li_yM2PO_4$. In the chemical formulae, M1 and M2 each represent at least one transition metal element, and the values of "x" and "y" vary depending on the state of charge and discharge of the battery, and these generally represent $0.05 \le x \le 1.10$ and $0.05 \le y \le 1.10$.

Examples of the complex oxides having lithium and a transition metal element may be mentioned, for example, lithium cobalt composite oxide ($Li_xCoO_2$), lithium nickel composite oxide ($Li_xNiO_2$), and the like, and examples of the phosphate compound having lithium and a transition metal element may be mentioned, for example, lithium iron phosphate compound ($LiFePO_4$), lithium iron manganese phosphate compound ($LiFe_{1-u}Mn_uPO_4$ ($0<u<1$)), and the like. By using the positive electrode material, high battery capacity can be obtained and excellent cycle characteristics can be also obtained.

[Negative Electrode]

The negative electrode has a structure similar to that of the negative electrode 10 shown in FIG. 1, and has, for example, a negative electrode active material layer on both sides of the current collector. In this negative electrode, it is preferable that the negative electrode charge capacity is larger than the electric capacity (charge capacity as a battery) obtained from a positive electrode active material agent. According to this constitution, deposition of lithium metal on the negative electrode can be suppressed.

The positive electrode active material layer is provided on a part of both surfaces of the positive electrode current collector, and the negative electrode active material layer is also provided on a part of both surfaces of the negative electrode current collector. In this case, for example, the negative electrode active material layer provided on the negative electrode current collector is provided with a region where no opposing positive electrode active material layer exists. This is to carry out a stable battery design.

At the region where the negative electrode active material layer and the positive electrode active material layer do not oppose to each other, there is almost no influence of charge and discharge. Therefore, the state of the negative electrode active material layer is maintained immediately after the formation, whereby the composition of the negative electrode active material or the like, can be accurately examined with good reproducibility without depending on the presence or absence of charge and discharge.

[Separator]

The separator is a material which separates the positive electrode and the negative electrode, and allows lithium ions to pass while preventing a current short circuit caused by contacting the both electrodes. This separator is made of, for example, a synthetic resin, or a porous film made of ceramic, and may have a laminated structure in which two or more kinds of porous films are laminated. The synthetic resin may be mentioned, for example, polytetrafluoroethylene, polypropylene, polyethylene and the like.

[Electrolyte]

At least a part of the active material layer or the separator is impregnated with a liquid electrolyte (an electrolytic solution). In this electrolytic solution, an electrolyte salt may be dissolved in a solvent, and other materials such as additives and the like may be also contained.

The solvent may be used, for example, a non-aqueous solvent. The non-aqueous solvent may be mentioned, for example, ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran and the like. Among these, it is desirable to use at least one of ethylene carbonate, propylene carbonate, dimethyl carbonate, diethyl carbonate and ethyl methyl carbonate. This is because better characteristics can be obtained. In this case, by using a high viscosity solvent such as ethylene carbonate, propylene carbonate or the like, in combination with a low viscosity solvent such as dimethyl carbonate, ethyl methyl carbonate, diethyl carbonate or the like, dissociation property and ion mobility of the electrolyte salt can be improved.

In the case of using an alloy-based negative electrode, it is particularly desirable that at least one of a halogenated linear carbonic acid ester and a halogenated cyclic carbonic acid ester is contained as a solvent. According to this constitution, a stable coating film can be formed on the surface of the negative electrode active material at the time of charge and discharge, particularly at the time of charging. Here, the halogenated linear carbonic acid ester is a linear carbonic acid ester having a halogen as a constituent element (at least one hydrogen is substituted by a halogen). In addition, the halogenated cyclic carbonic acid ester is a cyclic carbonic acid ester having a halogen as a constituent element (that is, at least one hydrogen is substituted by a halogen).

The kind of the halogen is not particularly limited, and fluorine is preferred. This is because a coating film having better quality than the other halogens is formed. In addition, the number of the halogens is preferably as large as possible. This is because the obtained coating film is more stable and the decomposition reaction of the electrolytic solution is reduced.

The halogenated linear carbonic acid ester may be mentioned, for example, fluoromethyl methyl carbonate, difluoromethyl methyl carbonate and the like. The halogenated cyclic carbonic acid ester may be mentioned, 4-fluoro-1,3-dioxolan-2-one, 4,5-difluoro-1,3-dioxolan-2-one and the like.

As a solvent additive, it is preferable to contain an unsaturated carbon bond cyclic carbonic acid ester. This is because a stable coating film is formed on the surface of the negative electrode at the time of charge and discharge, and the decomposition reaction of the electrolytic solution can be suppressed. The unsaturated carbon bond cyclic carbonic acid ester may be mentioned, for example, vinylene carbonate, vinyl ethylene carbonate and the like.

It is also preferable that sultone (cyclic sulfonic acid ester) is contained as a solvent. This is because chemical stability of the battery is improved. The sultone may be mentioned, for example, propane sultone and propene sultone.

Further, it is preferable that the solvent contains an acid anhydride. This is because chemical stability of the electrolytic solution is improved. Examples of the acid anhydride may include, for example, propane disulfonic acid anhydride.

The electrolyte salt may include, for example, at least one of light metal salts such as a lithium salt and the like. The lithium salt may be mentioned, for example, lithium hexafluorophosphate ($LiPF_6$), lithium tetrafluoro-borate ($LiBF_4$), and the like.

The content of the electrolyte salt is preferably 0.5 mol/kg or more and 2.5 mol/kg or less based on the content of the solvent. This is because high ion conductivity can be obtained.

[Method for Producing Laminate Film Type Lithium Ion Secondary Battery]

Initially, a positive electrode is produced by using the positive electrode material. First, a positive electrode active material and, if necessary, a binder, a conductive assistant and the like are mixed to form a positive electrode mixture, and then, dispersed in an organic solvent to prepare a positive electrode mixture slurry. Subsequently, the mixture slurry is coated to the positive electrode current collector with a coating apparatus such as a knife roll, a die coater having a die head and the like, and dried with hot air to obtain a positive electrode active material layer. Finally, the positive electrode active material layer is compression molded by a roll press machine or the like. At this time, the material may be heated, or heating or compression may be repeated a plurality of times.

Next, using the same operation procedure as in the production of the negative electrode 10, a negative electrode active material layer is formed on the negative electrode current collector to produce a negative electrode.

At the time of producing the positive electrode and the negative electrode, respective active material layers are formed on both surfaces of the positive electrode and the negative electrode current collector. At this time, a coated length of the active material on both surfaces of either of the electrodes may be deviated (see FIG. 1).

Subsequently, an electrolytic solution is prepared. Then, a positive electrode lead 32 is attached to the positive electrode current collector and a negative electrode lead 33 is attached to the negative electrode current collector by ultrasonic welding or the like. Subsequently, the positive electrode and the negative electrode are laminated or wound through a separator to produce a spirally wound electrode body 31, and a protective tape is adhered to the outermost peripheral portion thereof. Next, the spirally wound body is molded so as to have a flat shape. Then, after the spirally wound electrode body is sandwiched between the folded film-shaped exterior members, the insulation portions of the exterior member 35 are adhered to each other by a thermal fusion method, and in a state where the wound electrode body is released in only one direction, the spirally wound electrode body is sealed. An adhesive film is inserted between the positive electrode lead, the negative electrode lead and the exterior member. A prescribed amount of the prepared electrolytic solution was charged from the released portion and subjected to vacuum impregnation. After impregnation, the released portion is bonded by a vacuum thermal fusion method. The laminate film type lithium ion secondary battery 30 can be thus produced.

EXAMPLE

In the following, the present invention will be explained more specifically with reference to Examples and Comparative Examples, the present invention is not limited to the following Examples.

Example 1-1

By the following procedure, a laminate film type lithium ion secondary battery 30 shown in FIG. 2 was produced.

First, a positive electrode was produced. As the positive electrode active material, 95% by mass of $LiNi_{0.7}Co_{0.25}Al_{0.05}O$ (lithium nickel cobalt aluminum composite oxide: NCA) which is lithium nickel cobalt composite oxide, 2.5% by mass of the positive electrode conductive assistant, and 2.5% by mass of the positive electrode binder (polyvinylidene fluoride: PVDF) were mixed to prepare a positive electrode mixture. Subsequently, the positive electrode mixture was dispersed in an organic solvent (N-methyl-2-pyrrolidone: NMP) to form a paste slurry. Then, the slurry was coated on both surfaces of the positive electrode current collector by using a coating apparatus having a die head, and dried with a hot air drying apparatus. At this time, a positive electrode current collector having a thickness of 15 μm was used. Finally, compression molding was carried out with a roll press.

Next, the negative electrode was produced. The negative electrode active material was prepared by introducing a starting material obtained by mixing metal silicon and silicon dioxide into a reaction furnace, vaporizing it in an atmosphere having a degree of vacuum of 10 Pa and depositing it on an adsorption plate, and after sufficiently cooling, taking out the deposit material and pulverizing the same with a ball mill. After adjusting the particle size, a thermal decomposition CVD was carried out to form a carbon material on the surface of the particles of negative electrode active material. Subsequently, the particles of negative electrode active material, a precursor (polyamic acid) of the negative electrode binder, a conductive assistant 1 (scaly graphite) and a conductive assistant 2 (acetylene black) were mixed with a dry mass ratio of 80:8:10:2, and then, the mixture was diluted with NMP to prepare a paste-like negative electrode mixture slurry. In this case, NMP was used as a solvent for the polyamic acid. Then, the negative electrode mixture slurry was coated on the both surfaces of a negative electrode current collector with a coating apparatus, and then dried. As the negative electrode current collector, an electrolytic copper foil (the thickness is 15 μm) was used. Finally, it was fired in a vacuum atmosphere at 400° C. for 1 hour. According to this procedure, the negative electrode binder (polyimide) was formed. In addition, according to this procedure, the negative electrode active material layers were formed on both surfaces of the negative electrode current collector. At this time, the negative electrode current collector contained carbon and sulfur, and their contents were each 100 mass ppm or less.

Next, after mixing the solvents (4-fluoro-1,3-dioxolan-2-one (FEC), ethylene carbonate (EC) and dimethyl carbonate (DMC)), an electrolyte salt (lithium hexafluoro-phosphate: $LiPF_6$) was dissolved to prepare an electrolytic solution. In this case, the composition of the solvent was made FEC:EC:DMC=10:20:70 by a volume ratio, and the content of the electrolyte salt was made 1.0 mol/kg based on the content of the solvent.

Next, the secondary battery was assembled as follows. First, an aluminum lead was ultrasonically welded to one end of the positive electrode current collector, and a nickel lead was welded to one end of the negative electrode current collector. Subsequently, the positive electrode, a separator, the negative electrode and a separator were laminated in this order and wound in a longitudinal direction to obtain a spirally wound electrode body. The winding end portion was fixed with a PET protective tape. As the separator, a laminated film (the thickness is 12 μm) in which a film containing porous polyethylene as a main component was sandwiched by films containing porous polypropylene as a main component was used. Subsequently, after sandwiching the electrode body between exterior members, outer peripheral edges except for one side were thermally fused, and the electrode body was accommodated inside thereof. As the exterior member, an aluminum laminate film in which a nylon film, an aluminum foil and a polypropylene film had been laminated was used. Then, the prepared electrolytic solution was injected from the opening, impregnated in a vacuum atmosphere, then heat fused and sealed.

The cycle characteristics and the initial charge and discharge characteristics of the secondary battery thus produced were evaluated.

The cycle characteristics were examined as follows. First, in order to stabilize the battery, two cycles of charge and discharge were carried out in an atmosphere at 25° C., and the discharge capacity at the second cycle was measured. Subsequently, charge and discharge were carried out until the total number of cycles reached 100 cycles, and the discharge capacity was measured each time. Finally, the discharge capacity at the 100th cycle was divided by the discharge capacity at the 2nd cycle, and the capacity retention rate was calculated. As cycle conditions, the battery was charged at a constant current density of 2.5 mA/cm$^2$ until the voltage reached 4.2V. At the stage when the voltage reached 4.2V, the battery was charged at a constant voltage of 4.2V until the current density reached 0.25 mA/cm$^2$. At the time of discharge, the battery was discharged at a constant current density of 2.5 mA/cm$^2$ until the voltage reached 2.5V.

Regarding the initial charge and discharge characteristics, the initial efficiency (first time efficiency) (%)=(initial discharge capacity/initial charge capacity)×100 was calculated. The atmosphere and the temperature were the same as those in the case where the cycle characteristics were examined, and the charge and discharge conditions were 0.2-fold the case when the cycle characteristics were examined.

Example 1-2 to Example 1-7, Comparative Examples 1-1 and 1-2

Production of the secondary battery was carried out in the same manner as in Example 1-1 except that an average diameter of the silicon grains at the center portion of the particle, a concentration distribution width of each of silicon and oxygen at the center portion of the particle and a half intensity width (a half value width) (this is also reflected in the crystallite size calculated from the half intensity width) of a diffraction peak attributable to the Si (111) crystal plane obtained by X-ray diffraction were adjusted.

Figure 3:
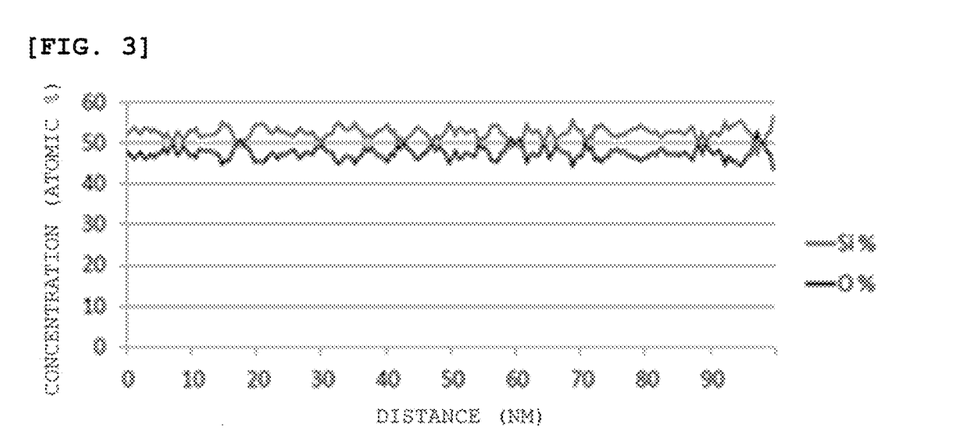
FIG. 3 is a drawing showing the concentration distribution at the region including of the particle in Example 1-4 of the present invention.

The concentration distribution width in Example 1-1 to Example 1-7 and Comparative Examples 1-1 and 1-2 were calculated as follows. First, the center portion of the particle was defined to be an inside of a cube with one side of 40 nm having a midpoint (center point) of the line segment where the length of the line is the longest as a center when a line is drawn from the outermost surface of the particle of the negative electrode active material through the interior of the particle to the opposite side. FIG. 3 is a drawing showing the concentration distribution at the region including the center portion of the particle in Example 1-4. As shown in FIG. 3, oxygen and silicon concentration distributions in the range of about 100 nm including the inside of the cube was measured using the atom probe method, numerical values in increments of 1 nm in the longitudinal direction were averaged, and the average values of the maximum value and the minimum value were obtained. Next, in consideration of error bars, the top five points where the peak intensity greatly changed were removed, and the upper and lower limit concentration distribution widths were calculated.

Figure 4:
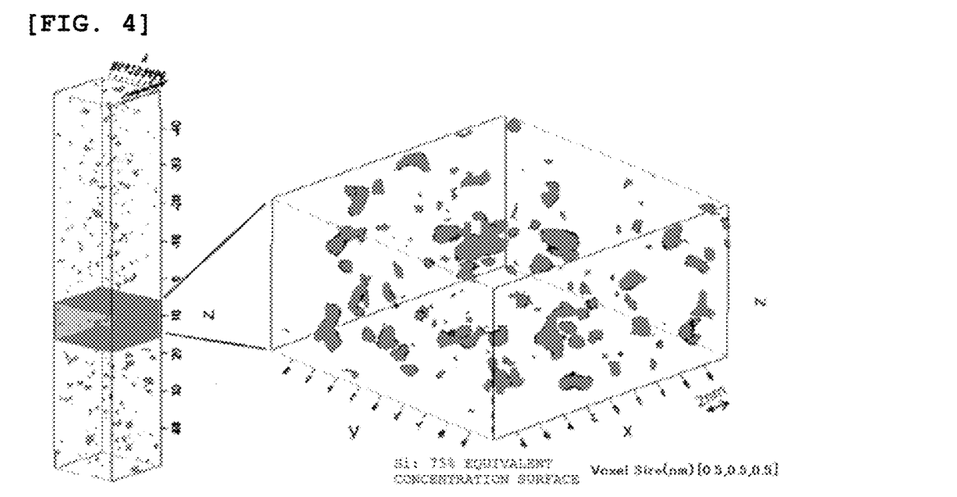
FIG. 4 is a drawing showing the configuration and the shape of the silicon grain at the center portion of the particle in Example 1-4 of the present invention.

An average diameter of the silicon grains at the center portion of the particle was calculated as follows. First, as a premise, although the crystallite size also changes with the change of silicon grains, there is a difference between the crystallite size calculated from the half intensity width and the diameter of the silicon grains calculated from the atom probe method. This is because, with regard to the 75% equivalent concentration surface of Si, it is connected to the portions at which 75 at % of Si is detected in Voxel Size (nm) [0.5, 0.5, 0.5]. FIG. 4 is a drawing showing the configuration and the shape of the silicon grain at the center portion of the particle in Example 1-4. The left side of FIG. 4 is a drawing showing a part of the cube having one side of 40 nm, and the right side of FIG. 4 is a drawing showing an enlarged view of a part of the rectangular parallelepiped on the left side of FIG. 4. As shown in FIG. 4, the average diameter of the silicon grains was cut out the silicon grains in three dimensions, and calculated from the average value of the long side and the short side of each grain size (average diameter= (average value of maximum length A+average value of minimum length B)/2).

The particles of negative electrode active material of Example 1-1 to Example 1-7 and Comparative Examples 1-1 and 1-2 had the following properties. "x" of $SiO_x$ was 1. The median diameter was 4 μm. The aspect ratio at the surface layer portion of the particle was larger than that of the center portion of the particle. The ratio A/B at the surface layer portion of the particle was larger than that of the center portion of the particle. It had the concentration distribution of silicon and oxygen each 10 at % or more in the depth direction. The silicon concentration at the surface layer portion of the particle was larger than that of the center portion of the particle. The average thickness of the carbon material was 100 nm.

TABLE 1

$SiO_x$ X = 1, D50 = 4 μm, Copper foil carbon, sulfur: present, aspect ratio: surface > center, A/B ratio: surface layer portion large, positive electrode: NCA, carbon coating layer present: 100 nm, concentration difference in depth direction: present, center portion-surface layer portion silicon ratio: surface layer portion large

|  | Center portion grain diameter nm | Center portion concentration distribution width | full width at half maximum intensity θ | Si (111) crystallite size nm | Capacity retention rate at 100 cycle | Initial efficiency % |
|---|---|---|---|---|---|---|
| Example 1-1 | 0.25 | 10 at % or less | 20.221 | 0 | 83 | 70.0 |
| Example 1-2 | 0.5 | 10 at % or less | 10.123 | 1.524 | 82 | 70.5 |
| Example 1-3 | 1 | 10 at % or less | 3.055 | 2.77 | 81 | 71.0 |
| Example 1-4 | 2 | 10 at % or less | 2.593 | 3.29 | 81 | 71.5 |
| Example 1-5 | 3 | 10 at % or less | 2.257 | 3.77 | 82 | 71.5 |
| Example 1-6 | 4 | 10 at % or less | 1.845 | 4.62 | 83 | 72.0 |
| Example 1-7 | 5 | 10 at % or less | 1.218 | 7.21 | 82 | 72.0 |
| Comparative Example 1-1 | 6 | Larger than 10 at % | 1.025 | 8.55 | 69 | 72.5 |
| Comparative Example 1-2 | 7 | Larger than 10 at % | 0.796 | 10.84 | 58 | 72.5 |

As shown in Table 1, FIG. 3 and FIG. 4, the concentration distribution width at the center portion of the particle is small, and the silicon is scattered finely, so that stable battery characteristics can be obtained. In addition, the smaller the silicon grains are, the better the battery cycle characteristics are, but the initial efficiency tended slightly lower. The minimum value of the average diameter of the silicon grains is 0.25 nm, and this is because 0.25 nm is the detection limit of the particle diameter in the atom probe method. If the average diameter is smaller than 0.25 nm, it is presumed that the battery cycle characteristics are favorably shifted, but it is also presumed that the initial efficiency lowers.

Example 2-1, Example 2-2, Comparative Examples 2-1 and 2-2

A secondary battery was produced in the same conditions as in Example 1-4 except for changing the oxygen concentration of the silicon compound, and cycle characteristics and initial efficiency were evaluated. When the oxygen concentration of the silicon compound was made changed, the average diameter of the silicon grains at the center portion of the particle, the concentration distribution width of silicon and oxygen at the center portion of the particle and the crystallite size (the half intensity width) were also simultaneously changed. The results are shown in Table 2. In the following Tables 2 to 6, the results of Example 1-4 are also shown.

TABLE 2

D50 = 4 µm, Copper foil carbon, sulfur: present, aspect ratio: surface > center, A/B ratio: surface layer portion large, positive electrode: NCA, carbon coating layer present: 100 nm, concentration difference in depth direction: present, center portion-surface layer portion silicon ratio: surface layer portion large

|  | $SO_x$ X = | Center portion grain diameter nm | Center portion concentration distribution width | full width at half maximum intensity θ | Si (111) crystallite size nm | Capacity retention rate at 100 cycle | Initial efficiency % |
|---|---|---|---|---|---|---|---|
| Example 1-4 | 1 | 2 | 10 at % or less | 2.593 | 3.29 | 81 | 71.5 |
| Comparative Example 2-1 | 0.3 | 8 | Larger than 10 at % | 0.588 | 12.66 | 48 | 74.0 |
| Example 2-1 | 0.5 | 5 | 10 at % or less | 1.119 | 7.18 | 75 | 72.0 |
| Example 2-2 | 1.5 | 1 | 10 at % or less | 3.012 | 2.81 | 80 | 70.5 |
| Comparative Example 2-2 | 1.8 | 0.5 | Examination of evaluation was stopped | | | Not charged and discharged | |

As shown in Table 2, when the oxygen concentration in the bulk is low, the silicon grains are easy to grow and degradation of silicon becomes remarkable. When the silicon concentration is high, for example, in the case of SiOx (x=1.8), the battery was not charged or discharged, or the amount of Li inserted was markedly lowered, so the evaluation as an active material was stopped.

Example 3-1 to Example 3-7

A secondary battery was produced in the same conditions as in Example 1-4 except for changing the thickness of the carbon material, and cycle characteristics and initial efficiency were evaluated. The results are shown in Table 3.

TABLE 3

$SiO_x$ X = 1, D50 = 4 µm, Copper foil carbon, sulfur: present, aspect ratio: surface > center, A/B ratio: surface layer portion large, positive electrode: NCA, grain diameter at center portion nm: 2 nm, concentration difference in depth direction: present, center portion-surface layer portion silicon ratio: surface layer portion large, concentration distribution width at center portion: 10 at % or less, full width at half maximum intensity: 2.59, crystallite: 3.29 nm

|  | Thickness of carbon coating layer nm | Capacity retention rate at 100 cycle | Initial efficiency % |
|---|---|---|---|
| Example 1-4 | 100 | 81 | 71.5 |
| Example 3-1 | 0 | 78 | 68.0 |
| Example 3-2 | 5 | 80 | 70.0 |
| Example 3-3 | 50 | 81 | 71.0 |
| Example 3-4 | 200 | 81 | 71.5 |
| Example 3-5 | 500 | 82 | 71.5 |
| Example 3-6 | 1,000 | 82 | 71.5 |
| Example 3-7 | 5,000 | 82 | 71.5 |

Battery characteristics were evaluated by changing the thickness of the carbon material, and as a result, when the carbon material was not deposited, both the initial battery efficiency and the retention rate lowered. It is presumed that the carbon material is partly effective for suppressing decomposition of the electrolytic solution. By increasing the thickness of the carbon material, the battery characteristics are stabilized, but as the carbon material becomes thicker, the battery capacity becomes difficult to improve. Even if the thickness is about 5 µm (5,000 nm) or so, the battery capacity is difficult to improve. In the experiment in which the thickness of the carbon material was about 7 µm or so, the capacity became less expressed. Based on assessment of these results comprehensively, it is considered that the thickness of the carbon material is desirably 5 µm or less.

Example 4-1

A secondary battery was produced under the same conditions as in Example 1-4 except for changing the concentration distribution of silicon and oxygen in the depth direction, and cycle characteristics and initial efficiency were evaluated. The results are shown in Table 4.

TABLE 4

$SiO_x$ X = 1, D50 = 4 µm, Copper foil carbon, sulfur: present, aspect ratio: surface > center, A/B ratio: surface layer portion large, positive electrode: NCA, particle diameter at center portion nm: 2 nm, carbon coating layer present: 100 nm, center portion-surface layer portion silicon ratio: surface layer portion large, concentration distribution width at center portion: 10 at % or less, full width at half maximum intensity: 2.59, crystallite: 3.29 nm

|  | Concentration gradient in depth direction | Capacity retention rate at 100 cycle | Initial efficiency % |
|---|---|---|---|
| Example 1-4 | Present | 81 | 71.5 |
| Example 4-1 | None | 77 | 67.0 |

Figure 5:
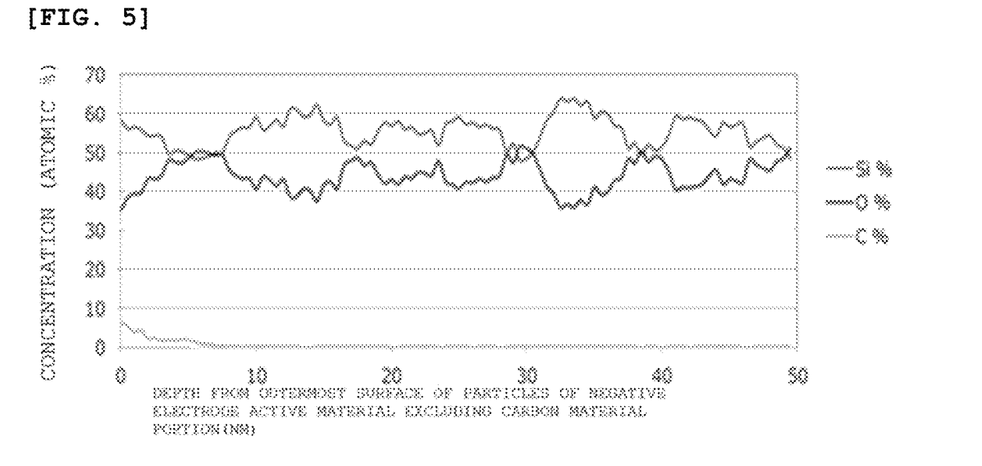
FIG. 5 is a drawing showing the concentration distribution of the surface layer portion of the particle in Example 1-4 according to the present invention.

FIG. 5 is a drawing showing the concentration distribution of the surface layer portion of the particle in Example 1-4. As shown in FIG. 5, when silicon and oxygen each have a concentration distribution of 10 at % or more in the depth direction, Li can be easily inserted and removed. In particular, as shown in FIG. 5, in addition to the concentration distribution of 10 at % or more, it is more preferred that a periodic concentration distribution is provided, and the composition ratio of silicon and oxygen at the time of providing the periodic concentration distribution is changed. The ratio of the silicon concentration and the oxygen concentration in the particles of the silicon compound is desirably substantially 1:1, but the surface layer portion of the particle is desirably silicon-rich. This is because Li can be easily inserted and removed.

Example 5-1

A secondary battery was produced under the same conditions as in Example 1-4 except for changing the silicon concentration at the surface layer portion of the particle and the aspect ratio of the silicon grains at the surface layer portion of the particle, and cycle characteristics and initial efficiency were evaluated. The results are shown in Table 5.

TABLE 5

$SiO_x$ X = 1, D50 = 4 μm, Copper foil carbon, sulfur: present, aspect ratio: surface layer portion large, A/B ratio: surface layer portion large, positive electrode: NCA, particle diameter at center portion nm: 2 nm, thickness of carbon coating layer nm: 100 nm, concentration distribution width at center portion: 10 at % or less, full width at half maximum intensity: 2.59, crystallite: 3.29 nm, concentration gradient in depth direction: present

|  | Ratio of center portion and surface layer portion | Aspect ratio | Capacity retention rate at 100 cycle | Initial efficiency % |
|---|---|---|---|---|
| Example 1-4 | Surface layer portion rich | Surface > center | 81 | 71.5 |
| Example 5-1 | Equivalent to center portion | Surface ≈ center | 80 | 68.0 |

Figure 6:
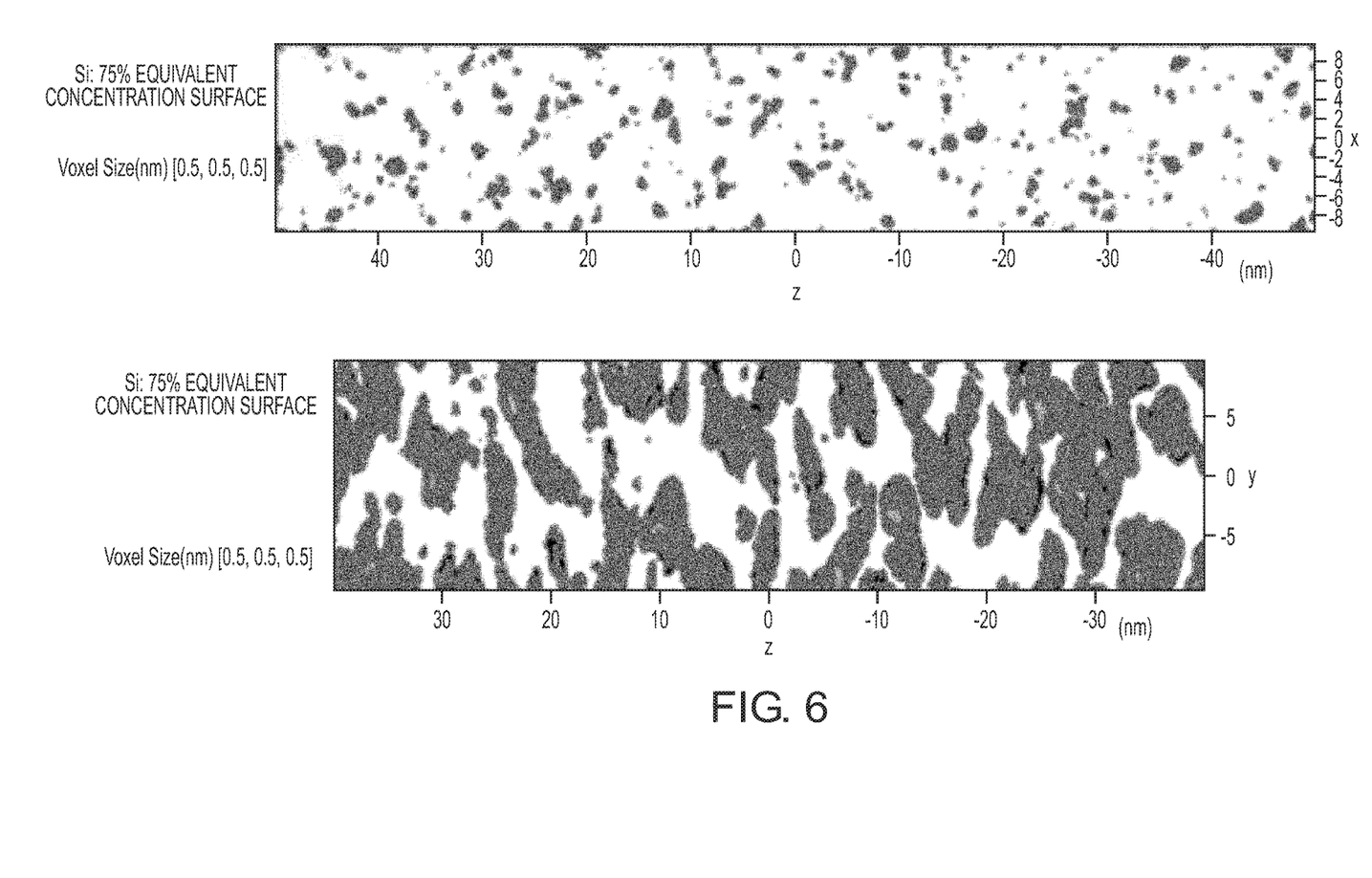
FIG. 6 is a drawing in which the aspect ratio of the silicon grains in Example 1-4 of the present invention is compared between the center portion of the particle and the surface layer portion of the particle.

FIG. 6 is a drawing in which the aspect ratio of the silicon grains in Example 1-4 is compared between the center portion of the particle and the surface layer portion of the particle. The upper side of FIG. 6 is a drawing showing the silicon grains at the center portion of the particle, and the lower side of FIG. 6 is a drawing showing the silicon grains at the surface layer portion of the particle. As shown in FIG. 6, the silicon grains of Example 1-4 are finely dispersed at the center portion of the particle, but at the surface layer portion of the particle, the Si's are bonded to each other and are enlarged (elongated). As shown in Table 5 and FIG. 6, it is desirable that the silicon concentration of the surface layer portion of the particle is high and at the same time the aspect ratio of the silicon grains at the surface layer portion of the particle is larger than the aspect ratio of the silicon grains at the center portion of the particle. This is because Li can be easily inserted and removed.

Example 6-1 to Example 6-5

A secondary battery was produced under the same conditions as in Example 1-4 except for changing the median diameter of the particles of negative electrode active material, and cycle characteristics and initial efficiency were evaluated. The results are shown in Table 6.

TABLE 6

$SiO_x$ X = 1, Copper foil carbon, sulfur: present, aspect ratio: surface > center, A/B ratio: surface layer portion large, positive electrode: NCA, grain diameter at center portion nm: 2 nm, concentration difference in depth direction: present, center portion-surface layer portion silicon ratio: surface layer portion large, concentration distribution width at center portion: 10 at % or less, full width at half maximum intensity: 2.59, crystallite: 3.29 nm, thickness of carbon coating layer nm: 100 nm

|  | Particle size μm | Capacity retention rate at 100 cycle | Initial efficiency % |
|---|---|---|---|
| Example 1-4 | 4 | 81 | 71.5 |
| Example 6-1 | 0.5 | 78 | 69.0 |
| Example 6-2 | 1 | 80 | 70.5 |
| Example 6-3 | 10 | 81 | 72.0 |
| Example 6-4 | 15 | 80 | 73.0 |
| Example 6-5 | 25 | 75 | 71.0 |

As shown in Table 6, when the particle diameter of the particles of negative electrode active material is 1 μm or more, increase in the surface area could be suppressed, so that both the battery retention rate and the initial efficiency tended to be better. In addition, when the particle size was 15 μm or less, it was found that the negative electrode active material was hardly expanded at the time of charging and the negative electrode active material was hardly broken, so that the battery characteristics could be improved.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A negative electrode active material which comprises:
a negative electrode active material containing particles of negative electrode active material, wherein the particles of negative electrode active material contain a silicon compound represented by $SiO_x$ (0.5≤x≤1.6), and when the particles of negative electrode active material are measured by an atom probe method and an Si 75% equivalent concentration surface obtained by the atom probe method is defined to be a boundary surface of a silicon grain, an average diameter of the silicon grains at a center portion of the particle in the particles of negative electrode active material is in the range of 0.25 nm to 5 nm, and
a ratio A/B of a maximum length A and a minimum length B of the silicon grain is calculated, an average value of the ratio A/B of the silicon grains contained at a surface layer portion of the particle in the particles of negative electrode active material is larger than an average value of the ratio A/B of the silicon grains contained at a center portion of the particle in the particles of negative electrode active material.

2. The negative electrode active material according to claim 1, wherein the particles of negative electrode active material are measured by the atom probe method, silicon and oxygen each have a concentration distribution of 1 at % or more and 10 at % or less at the center portion of the particle in the particles of negative electrode active material.

3. The negative electrode active material according to claim 1, wherein the particles of negative electrode active material have a carbon material on a surface thereof.

4. The negative electrode active material according to claim 3, wherein an average thickness of the carbon material is 5 nm or more and 5,000 nm or less.

5. The negative electrode active material according to claim 1, wherein, when the particles of negative electrode active material are measured by the atom probe method, silicon and oxygen each have a concentration distribution of 10 at % or more in the depth direction at the surface layer portion of the particle in the particles of negative electrode active material.

6. The negative electrode active material according to claim 1, wherein, when the particles of negative electrode active material are measured by the atom probe method, a silicon concentration at the surface layer portion of the particle in the particles of negative electrode active material is higher than a silicon concentration at the center portion of the particle in the particles of negative electrode active material.

7. The negative electrode active material according to claim 1, wherein, when an aspect ratio of the silicon grain is calculated, an average value of the aspect ratio of the silicon grains contained in the surface layer portion of the particle in the particles of negative electrode active material is larger than an average value of the aspect ratio of the silicon grains contained in the center portion of the particle in the particles of negative electrode active material.

8. The negative electrode active material according to claim 1, wherein the negative electrode active material has a half value width (2θ) of a diffraction peak attributable to a Si (111) crystal plane by X-ray diffraction of 1.2° or more and has a crystallite size corresponding to the crystal face is 7.5 nm or less.

9. The negative electrode active material according to claim 1, wherein a median diameter of the particles of negative electrode active material is 1 μm or more and 15 μm or less.

10. A negative electrode which comprises:
a negative electrode active material layer containing the negative electrode active material according to claim 1, and
a negative electrode current collector,
wherein, the negative electrode active material layer is formed on the negative electrode current collector, and
the negative electrode current collector contains carbon and sulfur, and contents of which are each 100 ppm by mass or less.

11. The negative electrode according to claim 10, wherein a length of the silicon grains in the negative electrode active material is increased by repeating charge and discharge of the negative electrode.

12. A lithium ion secondary battery which comprises: the negative electrode according to claim 10, wherein the negative electrode according to claim 10 is used as a negative electrode.

13. A method for producing a negative electrode material for a non-aqueous electrolyte secondary battery containing particles of negative electrode active material, which comprises:
preparing particles of negative electrode active material containing a silicon compound represented by the general formula: $SiO_x$ ($0.5 \leq x \leq 1.6$),
measuring the particles of negative electrode active material by an atom probe method,
when an Si 75% equivalent concentration surface obtained by the atom probe method is defined to be a boundary surface of a silicon grain, selecting particles of negative electrode active material having an average diameter of the silicon grains at a center portion of the particle in the particles of negative electrode active material of in the range of 0.25 nm to 5 nm and a ratio A/B of a maximum length A and a minimum length B of the silicon grain is calculated, an average value of the ratio A/B of the silicon grains contained at a surface layer portion of the particle in the particles of negative electrode active material is larger than an average value of the ratio A/B of the silicon grains contained at a center portion of the particle in the particles of negative electrode active material, and
producing a negative electrode material for a non-aqueous electrolyte secondary battery using the selected particles of negative electrode active material.

14. The method for producing a negative electrode material for a non-aqueous electrolyte secondary battery according to claim 13, wherein the method further comprises forming a carbon material on a surface of the particles of negative electrode active material before the step of measuring.

15. A method for producing a lithium ion secondary battery which comprises producing a negative electrode by using the negative electrode material for a non-aqueous electrolyte secondary battery produced by the method for producing a negative electrode material for a non-aqueous electrolyte secondary battery according to claim 13, and producing a lithium ion secondary battery using the produced negative electrode.

* * * * *